(12) United States Patent
Murakami

(10) Patent No.: US 10,992,242 B2
(45) Date of Patent: Apr. 27, 2021

(54) MOTOR DRIVING CONTROL DEVICE AND CONTROL METHOD OF MOTOR DRIVING CONTROL DEVICE

(71) Applicant: Minebea Mitsumi Inc., Nagano (JP)

(72) Inventor: Hiroaki Murakami, Hamamatsu (JP)

(73) Assignee: MINEBEA MITSUMI INC., Nagano (JP)

(*) Notice: Subject to any disclaimer, the term of this patent is extended or adjusted under 35 U.S.C. 154(b) by 0 days.

(21) Appl. No.: 15/842,082

(22) Filed: Dec. 14, 2017

(65) Prior Publication Data

US 2018/0183368 A1 Jun. 28, 2018

(30) Foreign Application Priority Data

Dec. 27, 2016 (JP) .............................. JP2016-252303

(51) Int. Cl.
*H02P 3/12* (2006.01)
*H02P 7/03* (2016.01)
*H02P 6/185* (2016.01)
*H02P 6/182* (2016.01)

(52) U.S. Cl.
CPC .............. *H02P 6/185* (2013.01); *H02P 6/182* (2013.01); *H02P 2203/05* (2013.01)

(58) Field of Classification Search
CPC ................. H02P 6/16; H02P 3/08; H02P 6/30
See application file for complete search history.

(56) References Cited

U.S. PATENT DOCUMENTS

| 2005/0258788 A1* | 11/2005 | Mori ......................... H02P 6/20 318/400.12 |
| 2008/0018274 A1 | 1/2008 | Mori et al. |
| 2010/0177626 A1* | 7/2010 | Otaguro .................... H02P 6/18 369/215.1 |

(Continued)

FOREIGN PATENT DOCUMENTS

| JP | 10-341588 A | 12/1998 |
| JP | 2005-333689 A | 12/2005 |

(Continued)

OTHER PUBLICATIONS

Decision to Grant a Patent dated May 27, 2019 for corresponding Japanese Application No. 2016-252303 and English translation.

*Primary Examiner* — Kawing Chan
*Assistant Examiner* — Charles S Laughlin
(74) *Attorney, Agent, or Firm* — Pearne & Gordon LLP

(57) ABSTRACT

A motor driving control device includes an induced voltage detecting unit configured to detect an induced voltage of a motor, a controller for generating a PWM signal, and an inverter circuit for outputting a driving signal to the motor based on the PWM signal. The controller is configured to detect a position detection signal, to measure a zero-cross point of the induced voltage of the motor based on a detected timing of an edge of the position detection signal, to stop output of the driving signal only for a predetermined period containing the zero-cross point of the induced voltage, to measure a pulse width of a regenerated voltage in the period, to calculate a zero-cross point of coil current based on the measurement result, and to adjust the energization timing based on the calculation result. The predetermined period is a period of one cycle of the PWM signal.

6 Claims, 9 Drawing Sheets

(56) References Cited

U.S. PATENT DOCUMENTS

2015/0042251 A1 2/2015 Suzuki
2016/0190960 A1* 6/2016 Kawai .................... H02P 27/08
                                                          318/400.03

FOREIGN PATENT DOCUMENTS

JP       2016-019448 A    2/2016
JP       2016-136820 A    7/2016

* cited by examiner

MOTOR DRIVING CONTROL DEVICE AND CONTROL METHOD OF MOTOR DRIVING CONTROL DEVICE

CROSS REFERENCE TO RELATED APPLICATIONS

This application claims the benefit of Japanese Patent Application No. 2016-252303, filed Dec. 27, 2016, which is hereby incorporated by reference in its entirety.

BACKGROUND

Technical Field

The present disclosure relates to a motor driving control device and a control method of a motor driving control device, and particularly to a motor driving control device for performing control using a PWM signal, and a control method of a motor driving control device.

Background

When a motor having multiple phases is driven, the motor can be efficiently driven by matching a phase of an induced voltage of each phase of the motor and a phase of a phase current with each other. However, when a phase difference occurs between the phase of the induced voltage and the phase of a coil current (phase current) due to variation of motor characteristics caused by the number of rotations of the motor, the load of the motor or the temperature, the driving efficiency is degraded.

Under such a situation, a method for adjusting the phase of the driving voltage with respect to the phase of the coil current has been disclosed.

For example, Japanese Patent Laid-Open No. 2016-19448 describes a motor driving method for stopping, for a certain time period, the operation of a driving circuit for driving a motor in a sinusoidal-wave driving mode at a timing where the polarity of the coil current varies, and adjusting the phase of a driving voltage to be output to the motor through the driving circuit based on the polarity of the induced voltage detected by voltage polarity detecting means within the stop time period.

In the motor driving device described in Japanese Patent Laid-Open No. 2016-19448, the following situation may occur.

That is, upon detection of a zero-cross point of the coil current, a holed section (driving stop period) is started, and when a zero-cross point of the induced voltage is detected during the period from the above time point until the time when a certain time has elapsed from that time point, both the zero-cross points are regarded as being coincident with each other (the coil current and the induced voltage are regarded as being in phase with each other). When the polarity of the induced voltage at the falling timing of a PWM synchronous signal is minus from the start of the holed section and the polarity of the induced voltage at the next falling timing changes to the plus, the zero-crosses point are regarded as being coincident with each other, so that the holed section is finished at the rising edge of the next PWM synchronous signal. Therefore, a phase difference occurs by at least the amount corresponding to a half cycle of the PWM synchronous signal.

The present disclosure is related to providing a motor driving control device capable of driving a motor more efficiently, and a control method for a motor driving control device.

SUMMARY

In accordance with one aspect of the present disclosure, a motor driving control device comprises: induced a voltage detecting unit for detecting an induced voltage of a motor; a controller for generating a PWM signal corresponding to an energization timing of the motor; and an inverter circuit for outputting a driving signal for driving the motor to the motor based on the PWM signal generated by the controller, wherein the controller comprises: a position detecting unit configured to detect a position detection signal containing a rising or falling edge representing a timing at which a position of a rotor is a predetermined position; a measuring unit configured to measure a zero-cross point of the induced voltage of the motor based on a detected timing of the edge of the position detection signal, and stopping output of the driving signal only for a predetermined period containing the zero-cross point of the induced voltage of the motor to measure a pulse width of a regenerated voltage of the motor in the period; a calculating unit configured to calculate a zero-cross point of coil current of the motor based on a measurement result of the measuring unit; and adjusting unit for adjusting the energization timing of the motor based on a calculation result of the calculating unit, the predetermined period being a period of one cycle of the PWM signal.

Preferably, the measuring unit stops output of the driving signal only for a predetermined period containing the edge of the position detection signal to measure a pulse width of a regenerated voltage of the motor in the period while a detection timing of the edge of the position detection signal is set as a zero-cross point of the induced voltage of the motor.

Preferably, the adjusting unit adjusts the energization timing of the motor so that the pulse width measured by the measuring unit is larger than zero and shorter than the length of one cycle of the PWM signal.

Preferably, the adjusting unit adjusts the energization timing of the motor so that the energization timing of the motor lags when the pulse width measured by the measuring unit is equal to zero, and adjusts the energization timing of the motor so that the energization timing of the motor advances when the pulse width measured by the measuring unit is equal to the length of one cycle of the PWM signal.

Preferably, the adjusting unit adjusts the energization timing of the motor so that the phase at the zero-cross point of the induced voltage of the motor and the phase at the zero-cross point of the coil current are coincident with each other.

According to another aspect of the present disclosure, in a control method of a motor driving control device including an induced voltage detecting unit configured to detect an induced voltage of a motor, a controller for generating a PWM signal corresponding to an energization timing of the motor and an inverter circuit for outputting a driving signal for driving the motor to the motor based on the PWM signal generated by the controller, the method comprises: a position detecting step of detecting a position detection signal containing a rising or falling edge representing a timing at which a position of a rotor is a predetermined position; a measuring step of measuring a zero-cross point of the induced voltage of the motor based on a detected timing of the edge of the position detection signal, and stopping output of the driving signal only for a predetermined period containing the zero-cross point of the induced voltage of the motor to measure a pulse width of a regenerated voltage of the motor in the period; a calculating step of calculating a zero-cross point of coil current of the motor based on a measurement result of the measuring step; and an adjusting step of adjusting the energization timing of the motor based on a calculation result of the calculating step, the predetermined period being a period of one cycle of the PWM signal.

According to the present disclosure, a motor driving control device capable of driving a motor more efficiently, and a control method for a motor driving control device are provided.

DETAILED DESCRIPTION

Hereinafter, electronic equipment using a motor driving control device according to one embodiment of the present disclosure will be described.

First Embodiment

Figure 1:
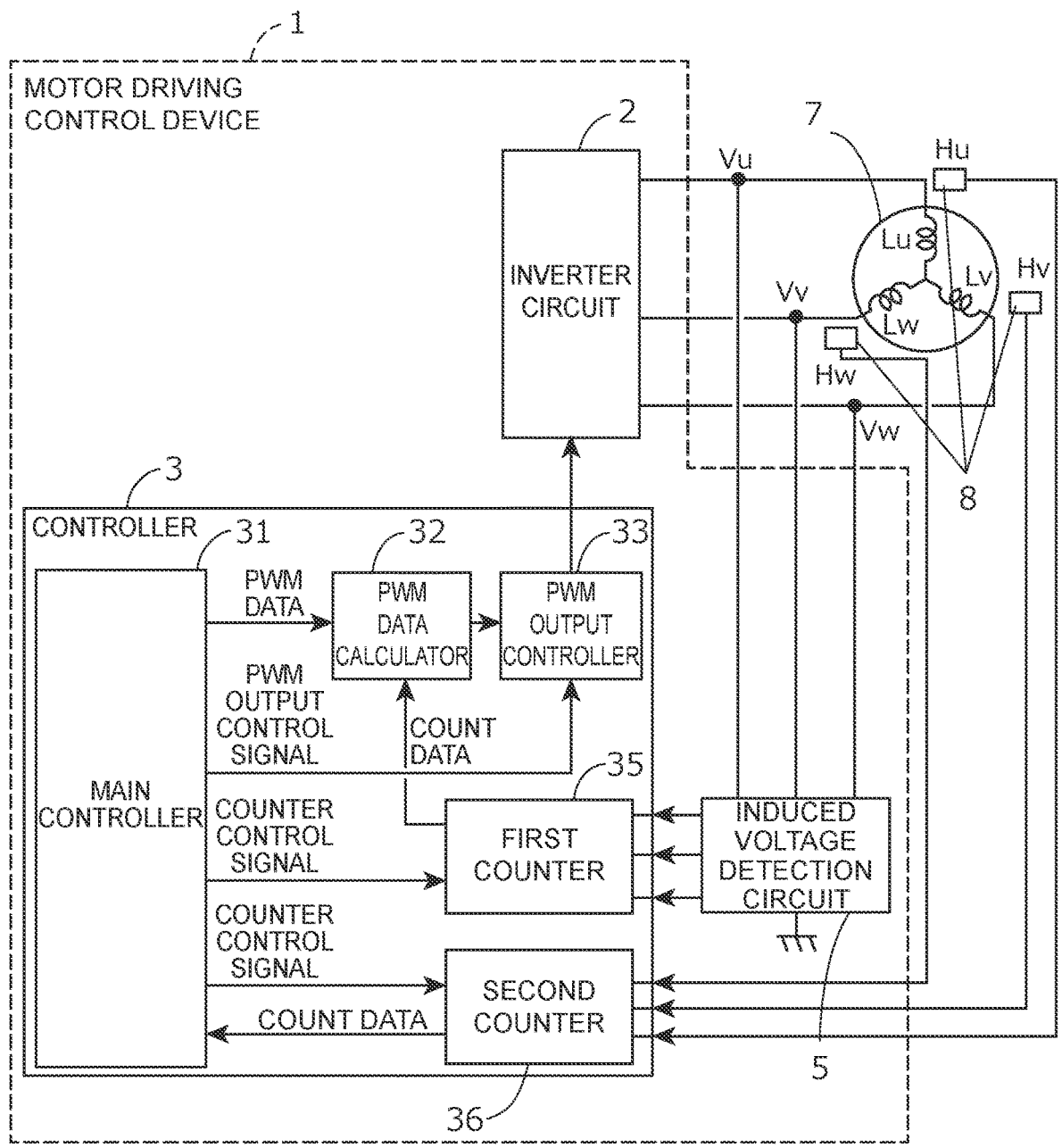
FIG. 1 is a block diagram schematically showing a circuit configuration of a motor driving control device according to a first embodiment of the present disclosure.

FIG. 1 is a block diagram schematically showing a circuit configuration of a motor driving control device 1 according to a first embodiment of the present disclosure.

As shown in FIG. 1, the motor driving control device 1 is configured to drive a motor 7, for example, according to a sinusoidal-wave driving mode. In the present embodiment, the motor 7 is a brushless motor having three phases, for example. The motor driving control device 1 supplies the motor 7 with driving power to drive the motor 7. Specifically, for example, the motor driving control device 1 drives the motor 7 by outputting a sinusoidal-wave driving signal to the motor 7 so that driving current is made to periodically flow through armature coils Lu, Lv and Lw of the motor 7, thereby causing the motor 7 to rotate. The motor 7 is not limited to the brushless motor, but it may be another motor. Furthermore, the driving method of the motor 7 is not limited to the sinusoidal-wave driving mode, but it may be another driving mode.

The motor driving control device 1 includes an inverter circuit 2, a controller 3 and an induced voltage detection circuit (an example of the induced voltage detecting unit) 5. The motor driving control device 1 is supplied with a predetermined power supply voltage, for example. The constituent elements shown in FIG. 1 are some of all constituent elements constituting the motor driving control device 1, and the motor driving control device 1 may have other constituent elements in addition to the constituent elements shown in FIG. 1.

The motor driving control device 1 drives the motor 7 based on commands concerning the rotational speed and the operation of the motor 7 which are transmitted from a host device (not shown). The host device is electronic equipment or the like in which the motor 7 and the motor driving control device 1 are installed, for example. The motor driving control device 1 may be configured to drive the motor 7 at a predetermined rotational speed or the like not depending on a command or the like from another device.

In the present embodiment, the inverter circuit 2, the controller 3 and the induced voltage detection circuit 5 are configured as a single integrated circuit device (IC) obtained by integrating and packaging circuits for implementing respective functions. Each component may be packaged as an individual integrated circuit device, or all or some components of the motor driving control device 1 may be packaged together with another device (other devices) to constitute an integrated circuit device.

The inverter circuit 2 outputs a driving signal for driving the motor 7 to the motor 7 based on a PWM signal generated and output by the controller 3 as described later. The driving signal is output to each of the coils Lu, Lv, Lw of the respective phases (U phase, V phase, W phase) of the motor 7, whereby voltages Vu, Vv, Vw are applied to the coils Lu, Lv, Lw of the respective phases.

The inverter circuit 2 is configured, for example by arranging each pair of in-series circuits each comprising two switch elements provided at both the ends of a power supply voltage for each phase of the motor 7. With respect to each pair of the two switching elements, the terminal of each phase of the motor 7 is connected to the connection point between the switching elements. The magnitude of coil current flowing through the coil Lu, Lv, LW of the phase and the direction of the coil current are altered by changing the combination of ON and OFF of the two switching elements for each phase.

The controller 3 outputs the PWM signal to the inverter circuit 2 to operate the inverter circuit 2 and drive the motor 7. Information on the position of the rotor of the motor 7 and information on the induced voltage of each phase of the motor 7 are input to the controller 3. The controller 3 outputs the PWM signal by using the information on the position of the rotor and the information on the induced voltage so that the energization timing of the motor 7 becomes proper. That is, the controller 3 generates the PWM signal corresponding to the energization timing of the motor 7.

The induced voltage detection circuit 5 functions as induced voltage detecting unit configured to detect the induced voltage of each phase of the motor 7, and outputs a detection result to the controller 3. The induced voltage detection circuit 5 is connected to lines for outputting driving signals from the inverter circuit 2 to the coils Lu, Lv, Lw of the motor, respectively. The induced voltage detection circuit 5 monitors the voltages of the lines connected to the respective coils Lu, Lv, Lw and detects the induced voltages of the respective phases. Furthermore, the induced voltage detection circuit 5 subjects detection results to level conversion and then outputs the level-converted detection results to the controller 3. For example, the induced voltage detection circuit 5 subjects the voltage of each line to resistive voltage division so that the voltage becomes a signal having a magnitude of 5V at maximum, and then outputs the signal to the controller 3. The controller 3 controls to generate the PWM signal by using the signal output from the induced voltage detection circuit 5 as the information on the induced voltage.

In the present embodiment, a Hall sensor 8 (Hu, Hv, Hw) as a position detector is arranged for each phase of the motor 7. Each Hall sensor 8 is a Hall element, a Hall IC or the like for detecting a magnetic flux varying in connection with rotation of the rotor of the motor 7. The controller 3 (specifically, a second counter 36 described later) is connected to each Hall sensor 8, and generates a Hall signal (an example of a position detection signal) by using the detection result of each Hall sensor 8, and detects the position of the rotor of the motor 7. In other words, the controller 3 achieves the information on the position of the rotor by using the Hall sensor 8. The Hall signal is a signal representing the position of the rotor, and it is used as a reference for the energization timing.

As described below, the controller 3 an includes position detecting unit configured to detect a Hall signal containing a rising or falling edge representing a timing at which the position of the rotor is a predetermined position, a measuring unit configured to measure a zero-cross point of the induced voltage of the motor 7 based on the detection timing of the edge of the position detection signal, and stopping the output of the driving signal only for a predetermined period containing the zero-cross point of the induced voltage of the motor 7 to measure the pulse width of a regenerated voltage of the motor 7 in the period, a calculating unit configured to calculate a zero-cross point of coil current of the motor 7 based on the measurement result of the measuring unit, and an adjusting unit configured to adjust the energization timing of the motor 7 based on the calculation result of the calculating unit. The controller 3 includes a main controller 31, a PWM data calculator (an example of the calculating unit, an example of adjusting unit) 32, a PWM output controller 33, a first counter (an example of the measuring unit) 35 and a second counter 36 (an example of the position detecting unit).

The induced voltage detection circuit 5 is connected to the first counter 35. Furthermore, the Hall sensors 8 are connected to the second counter 36. The second counter 36 is connected to the main controller 31. The main controller 31 generates PWM data based on the detection results (count data) of the Hall sensors 8 by the second counter 36. The PWM data are data serving as a base of a PWM signal to be output to the inverter circuit 2, and for example, the data are data representing the sinusoidal wave corresponding to each phase. The PWM data are output to the PWM data calculator 32. The main controller 31 outputs, to the PWM output controller 33, a PWM output control signal for controlling whether the PWM signal is output from the controller 3 to the inverter circuit 2.

The PWM data calculator 32 performs calculation based on the PWM data output from the main controller 31 to generate a PWM signal which is to be output to the inverter circuit 2 and has been adjusted to be advanced or the like. The generated PWM signal is output to the PWM output controller 33. On the basis of the PWM output control signal output from the main controller 31, the PWM output controller 33 controls whether the PWM signal output from the PWM data calculator 32 is to be output to the inverter circuit 2.

In the present embodiment, the main controller 31 outputs a counter control signal to each of the first counter 35 and the second counter 36. The counter control signal is, for example, data for resetting the count value of the first counter 35 and the count value of the second counter 36, and starting counting. The first counter 35 and the second counter 36 count clock signals used in the controller 3. The count value is data representing the length of the time.

The second counter 36 functions as a position detecting unit configured to detect, based on the detection result of the Hall sensor 8, a Hall signal containing a rising or falling edge representing a timing at which the position of the rotor is a predetermined position. Specifically, in the present embodiment, the second counter 36 counts the timing of the rising edge of the Hall signal of each phase. The main controller 31 reads a count value (count data) input from the second counter 36, thereby enabling the main controller 31 to achieve the rising timing of the Hall signal. The count value is reset at a time when the Hall signal has a rising edge, and the count has been carried out until the next rising edge. The second counter 36 may be configured to count the periods between the falling edges of the Hall signal of each phase. In this case, the second counter 36 may be configured to reset the count value at a time when the Hall signal has a falling edge, and count the periods until the next falling edge.

The main controller 31 achieves a zero-cross point of the induced voltage of the motor 7 based on the count data input from the second counter 36. Specifically, for example, the positional relationship in phase between the rising timing of the Hall signal and the zero-cross point of the induced voltage is set in the controller 3 in advance. The main controller 31 achieves the zero-cross point of the induced voltage of the motor 7 by approximating the zero-cross point to the detection timing of the rising edge of the Hall signal. That is, the main controller 31 achieves the rising timing of the Hall signal based on the count data of the second counter 36, and achieves the zero-cross point of the induced voltage corresponding to the rising timing. In the present embodiment, the position of the Hall sensor 8 is set so that the detection timing of the rising edge of the Hall signal can be detected as the zero-cross point of the induced voltage of the motor 7.

The main controller 31 stops the output of the driving signal only for a predetermined period containing the zero-cross point of the induced voltage of the motor 7 (called as an output off period in some cases) in connection with the detection of the rising edge of the Hall signal of a predetermined phase (for example, U phase or the like). As described above, since the detection timing of the rising edge of the Hall signal is detected as the zero-cross point of the induced voltage of the motor 7, the main controller 31 stops the output of the driving signal only for the predetermined period containing the rising edge of the Hall signal. For example, the main controller 31 controls the operation of the PWM output controller 33 so as to output the PWM output control signal to the PWM output controller 33 and so as not to output the PWM signal from the controller 3 to the inverter circuit 2 during the output off period. As a result, the output of the driving signal in the predetermined period is stopped. Here, the output off period is the period of one cycle of the PWM signal containing the rising edge of the Hall signal.

During the output off period, one end of the coil of the motor 7 is set to a high impedance state by turning off the switch element at the output stage of the inverter circuit 2. When coil current flows in a flow-in direction (source direction) from the switch element to the coil, the terminal voltage is equal to a value in the vicinity of the ground voltage. On the other hand, when the coil current flows in a flow-in direction (sink direction) from the coil to the switch element, the terminal voltage is equal to a value in the vicinity of the power supply voltage (for example, 5V). The regenerated voltage of the coil varies in accordance with the direction of the coil current. That is, the zero-cross point of the coil current can be detected by detecting the variation of the regenerated voltage of the coil in the output off period.

The induced voltage detection circuit 5 is connected to the first counter 35. The first counter 35 functions as a measuring unit configured to measure the pulse width of the regenerated voltage of the motor 7 in the output off period. The first counter 35 stops the output of the driving signal only for the output off period containing the edge of the Hall signal to measure the pulse width of the regenerated voltage of the motor 7 in the period while the detection timing of the edge of the Hall signal is set as the zero-cross point of the induced voltage of the motor 7. For example, on the basis of the signal output from the induced voltage detection circuit 5, the first counter 35 measures the time period (the pulse width of the regenerated voltage) from a state where the regenerated voltage of a predetermined phase occurs until a time point when the induced voltage of the phase varies from the minus to the plus in the output off period of the PWM signal provided for a predetermined phase as described above. The pulse width of the regenerated voltage is measured as a count value by incrementing the count value under the state where the regenerated voltage occurs. The count value (count data) representing the pulse width of the regenerated voltage can be read in by the PWM data calculator 32. In other words, the count data are output to the PWM data calculator 32.

The PWM data calculator 32 functions as a calculating unit configured to calculate the zero-cross point of the coil current of the motor 7 based on the count value representing the pulse width of the regenerated voltage. The PWM data calculator 32 functions as an adjusting unit configured to adjust the energization timing of the motor 7 based on the calculation result of the zero-cross point of the coil current. That is, the PWM data calculator 32 generates the PWM signal based on the calculation result of the zero-cross point of the coil current so that the energization timing of the motor 7 becomes optimum.

The PWM data calculator 32 adjusts the energization timing of the motor 7 so that the pulse width of the regenerated voltage is larger than zero and shorter than the length of one cycle of the PWM signal. Specifically, the PWM data calculator 32 adjusts the energization timing of the motor 7 so as to make the energization timing late (the phase of the coil current is delayed) when the pulse width of the regenerated voltage is equal to zero, and also adjusts the energization timing of the motor 7 so as to make the energization timing early (the phase of the coil current is advanced) when the pulse width of the regenerated voltage is equal to the length of one cycle of the PWM signal. The PWM data calculator 32 adjusts the energization timing of the motor 7 so that the phase at the zero-cross point of the induced voltage of the motor 7 is coincident with the phase of the zero-cross point of the coil current, for example.

Figure 2:
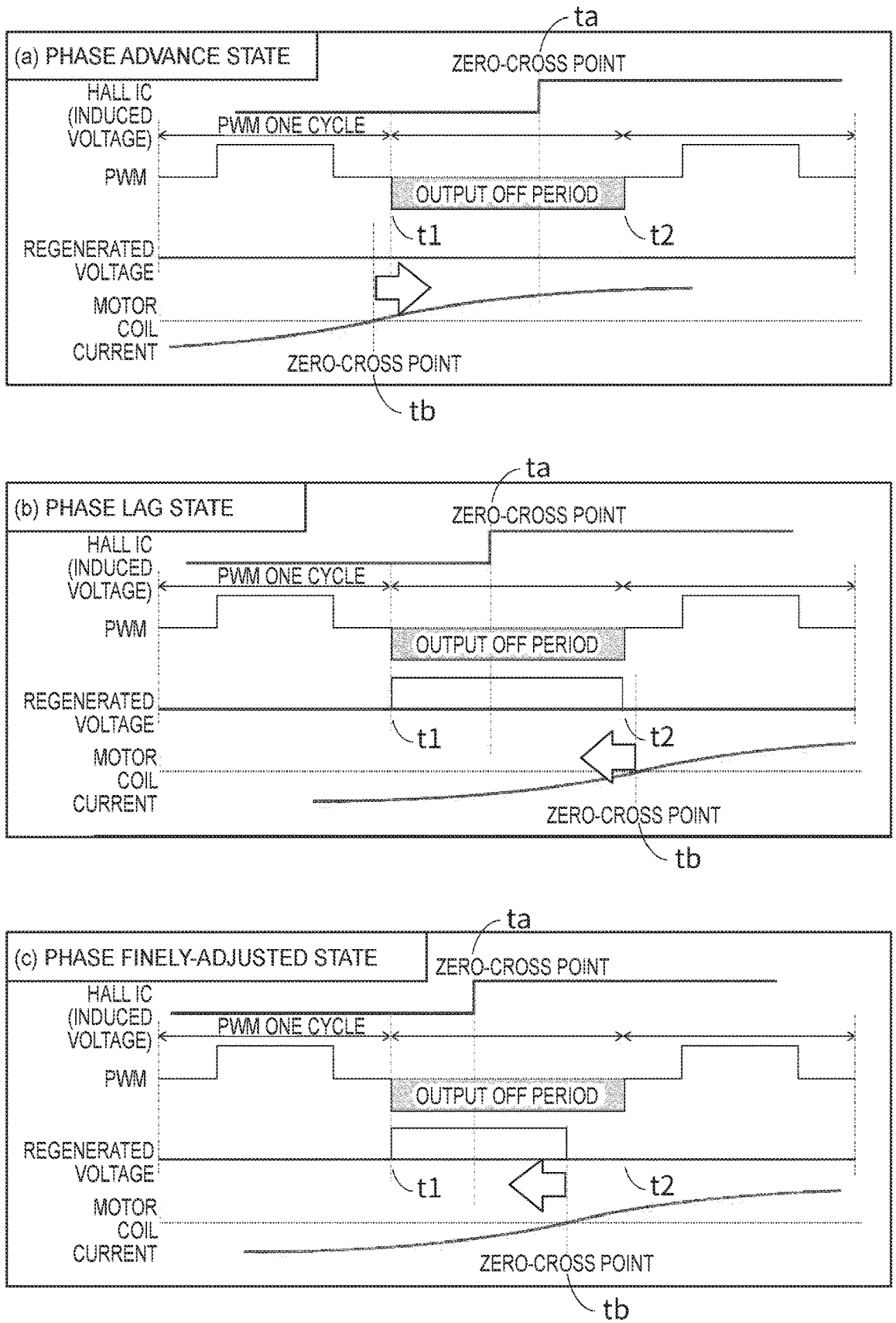
FIG. 2 is a diagram showing the operation of a controller according to the present embodiment.

FIG. 2 is a diagram showing the operation of the controller 3 according to the present embodiment.

In FIG. 2, a waveform example under a phase-advanced state is schematically shown at an upper stage (a), a waveform example under a phase-delayed state is schematically shown at a middle stage (b), and a waveform example under a phase finely-adjusted state is schematically shown at a lower stage (c). In each waveform example, the Hall signal (that is, the signal representing the zero-cross point of the induced voltage), the PWM signal, the regenerated voltage and the coil current are successively shown from the upper stage. The waveform examples of a predetermined phase (for example, U phase) are shown, but they are not limited to this phase.

In each waveform example, a time ta represents the timing of a zero-cross point of the induced voltage, that is, the timing of a rising edge of the Hall signal. A time tb represents the timing of a zero-cross point of the coil current of the motor 7. A time t1 represents a start timing of one cycle straddling the time ta of the PWM signal corresponding to this phase, and a time t2 represents the timing at which one cycle of the PWM signal has elapsed from the time t1.

The main controller 31 stops the output of the PWM signal only for a predetermined period (the time period from the time t1 to the time t2) containing the zero-cross point (time ta) of the induced voltage, and stops the output of the driving signal (the output off period of the PWM signal).

Here, the phase-advanced state shown at the upper stage (a) of FIG. 2 is a state where the zero-cross point (time tb) of the coil current of the motor 7 has arrived earlier than the time t1. In this case, the output off period from the time t1 to the time t2 is started and finished under the state where the coil current has passed a zero-cross point and thus the phase of the coil current becomes plus. Therefore, no regenerated voltage occurs in the output off period. At this time, the pulse width of the regenerated voltage is equal to zero. That is, the count value of the first counter 35 is equal to zero, and the energization timing of the motor 7 is adjusted to be late by the PWM data calculator 32, thereby delaying the phase of the coil current.

The state where the phase shown at the middle stage (b) of FIG. 2 is late is a state where the zero-cross point (time tb) of the coil current of the motor 7 has arrived later than the time t2. In this case, the output off period from the time t1 to the time t2 is started and finished under the state where the phase of the coil current is minus before the zero-cross point of the coil current has come. Therefore, the regenerated voltage occurs in the whole period of the output off period. At this time, the pulse width of the regenerated voltage is equal to the length of one cycle of the PWM signal. That is, the count value of the first counter 35 becomes a value representing one cycle of the PWM signal. The energization timing of the motor 7 is adjusted to be earlier by the PWM data calculator 32, thereby advancing the phase of the coil current.

The state shown at the lower stage (c) of FIG. 2 is a state where the zero-cross point (time tb) of the coil current of the motor 7 is within the output off period. That is, it is a state where the time tb has arrived later than the time t1 and earlier than the time t2. In this case, the phase of the coil current changes from the minus to the plus within the output off period. Therefore, the regenerated voltage occurs from the time t1 at which the output off period starts until the time tb at which the zero-cross point has come. At this time, the count value of the first counter 35 becomes a value representing the time period from the time t1 to the time tb. At this time, the energization timing of the motor 7 is also adjusted according to the count value of the first counter 35 by the PWM data calculator 32. Specifically, the energization timing of the motor 7 is adjusted so that the phase at the zero-cross point of the induced voltage of the motor 7 is coincident with the phase at the zero-cross point of the coil current.

In the present embodiment, the state where the phase is greatly deviated as shown at the upper stage (a) or the middle state (b) is changed to the state shown at the lower stage (c) by adjusting the phase under the control of the controller 3. Even under the state shown at the lower stage (c), the phase of the coil current is finely adjusted so that the phase at the zero-cross point of the induced voltage of the motor 7 is coincident with the phase at the zero-cross point of the coil current, thereby achieving a state where the motor 7 is efficiently driven.

Figure 3:
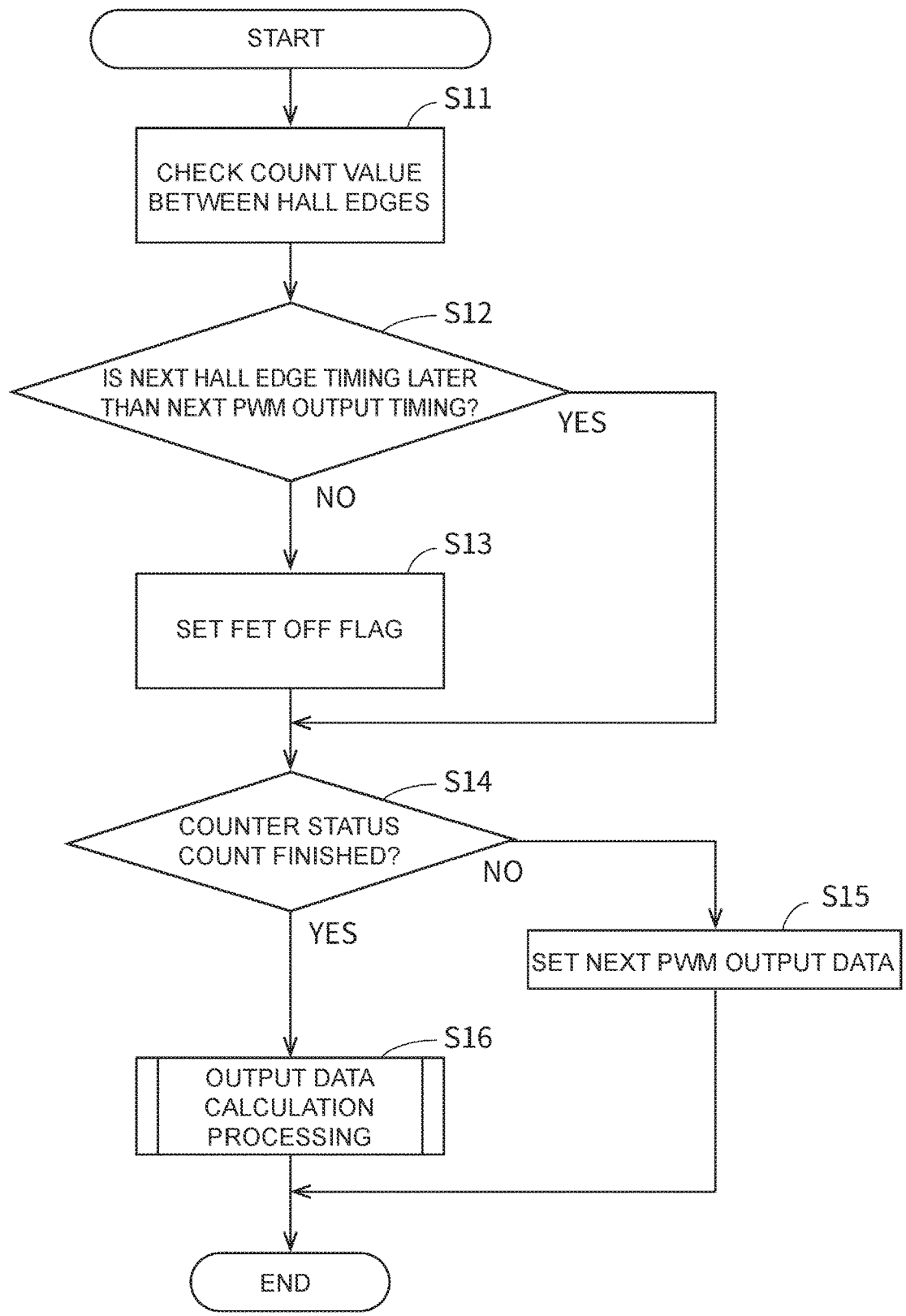
FIG. 3 is a flowchart showing the operation of the controller.

FIG. 3 is a flowchart showing the operation of the controller 3.

The controller 3 repetitively performs the following operation when the driving of the motor 7 is controlled. The following operation is performed on a predetermined phase (for example, U phase or the like). When the adjustment of the energization timing for the predetermined phase is performed, the energization timings of the other phases are also adjusted according to the above adjustment. The following operation may be performed on each phase to adjust the energization timing.

In step S11, the main controller 31 checks the count value between the rising edges of the Hall signal based on the count data input from the second counter 36. The main controller 31 grasps the timing at which the rising edge of a next Hall signal has arrived.

In step S12, the main controller 31 determines whether the timing (PWM output timing) at which the output of a next PWM signal (the period of the PWM signal) is started is later than the timing of the rising edge of the next Hall signal (Hall edge timing). When the timing at which the output of the next PWM signal (the period of the PWM signal) is started is later than the timing of the rising edge of the next Hall signal, the main controller 31 goes to step S14.

When the timing at which the output of the next PWM signal is started is the same as or later than the timing of the rising edge of the next Hall signal in step S12, the main controller 31 goes to step S13. In step S13, the main controller 31 sets an FET OFF flag. The FET OFF flag is a flag representing start of the output off period.

In step S14, the PWM data calculator 32 checks whether the count of the first counter 35 is finished. For example, when the output off period is finished or when the rising edge of the Hall signal has arrived (that is, when the zero-cross point of the induced voltage has arrived), the PWM data calculator 32 determines that the count of the first counter 35 is finished, and goes to the processing of step S16. In the other cases, the PWM data calculator 32 determines that the count is not finished (No in step S14), and goes to the processing of step S15.

In step S15, the PWM data calculator 32 sets output data of a PWM signal to be next output. As a result, the PWM signal is output based on the set data when the period of the next PWM signal starts.

In step S16, the PWM data calculator 32 performs output data calculation processing.

When the processing of step S15 or the processing of step S16 is finished, a series of operations is finished.

Figure 4:
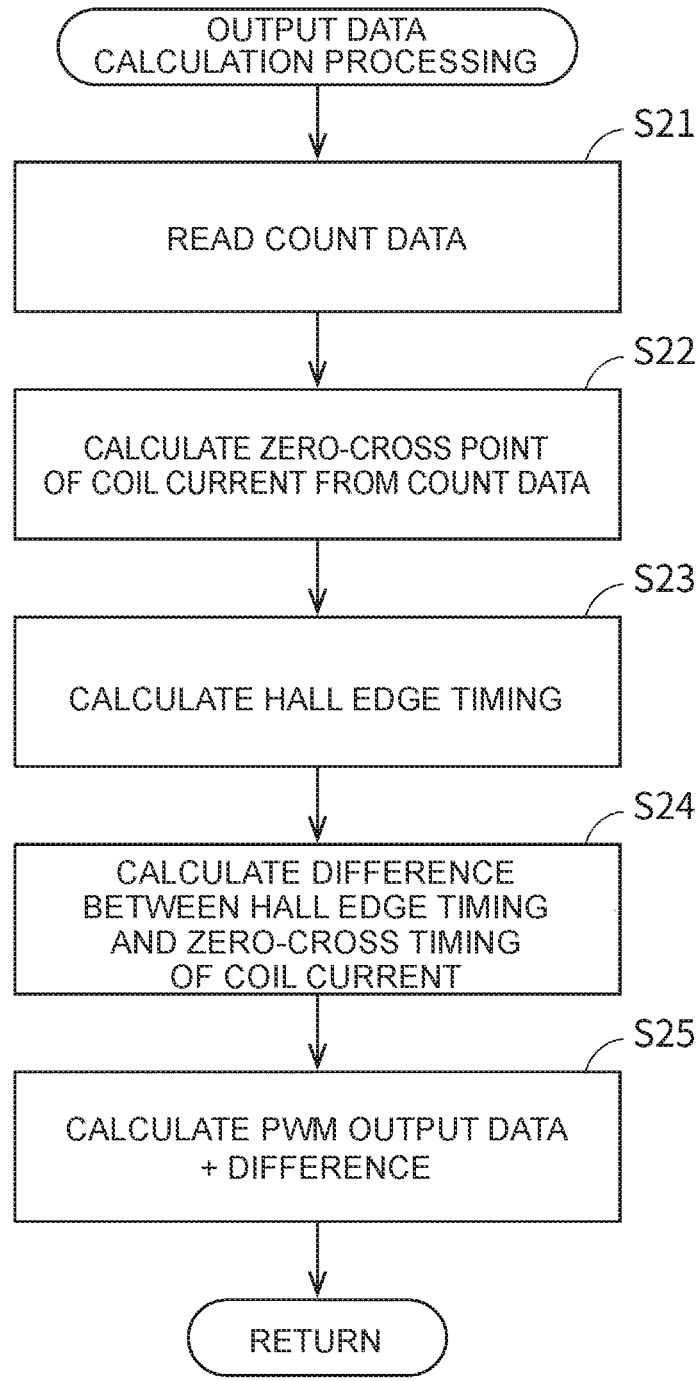
FIG. 4 is a flowchart showing the flow of output data calculation processing.

FIG. 4 is a flowchart showing the flow of the output data calculation processing.

The control method of the motor driving control device 1 includes a position detecting step and a measuring step in addition to output data calculation processing described below with reference to FIG. 4. That is, In the position detecting step, the second counter 36 detects a position detection signal containing a rising or falling edge representing the timing when the position of the rotor is a predetermined position. In the measuring step, the first counter 35 measures a zero-cross point of the induced voltage of the motor 7 based on the detection timing of the edge of the Hall signal, and also stops the output of the driving signal only for a predetermined period containing the zero-cross point of the induced voltage of the motor 7 to measure the pulse width of the regenerated voltage of the motor 7 in the period concerned. As described below, the control method of the motor driving control device 1 includes a calculating step of calculating a zero-cross point of the coil current of the motor 7 based on the measurement result of the measuring step above, and an adjusting step of adjusting the energization timing of the motor 7 based on the calculation result of the calculating step. As shown in FIG. 4, the PWM data calculator 32 reads the count data of the first counter 35 in step S21.

In step S22, the PWM data calculator 32 calculates the zero-cross point of the coil current based on the measurement result of the pulse width of the regenerated voltage of the motor 7 by using the counter data input from the first counter 35 (calculating step). Then, the PWM data calculator 32 calculates the time (zero-cross timing) from the start of the output off period to the zero-cross point of the coil current.

In step S23, the PWM data calculator 32 calculates the time (Hall edge timing) from the start of the output off period to the output of the rising edge of the Hall signal based on the PWM data input from the main controller 31.

In step S24, the PWM data calculator 32 calculates the difference between the time (Hall edge timing) from the start of the output off period to the output of the rising edge of the Hall signal and the time (zero-cross timing) from the start of the output off period to the zero-cross point of the coil current.

In step S25, the PWM data calculator 32 generates a PWM signal based on the difference between the timing of the rising edge of the Hall signal and the timing of the zero-cross point of the coil current. That is, the PWM data calculator 32 adjusts the energization timing to generate the PWM signal so that the difference between the timing of the rising edge of the Hall signal and the timing of the zero-cross point of the coil current approaches to zero (adjusting step).

Figure 5:
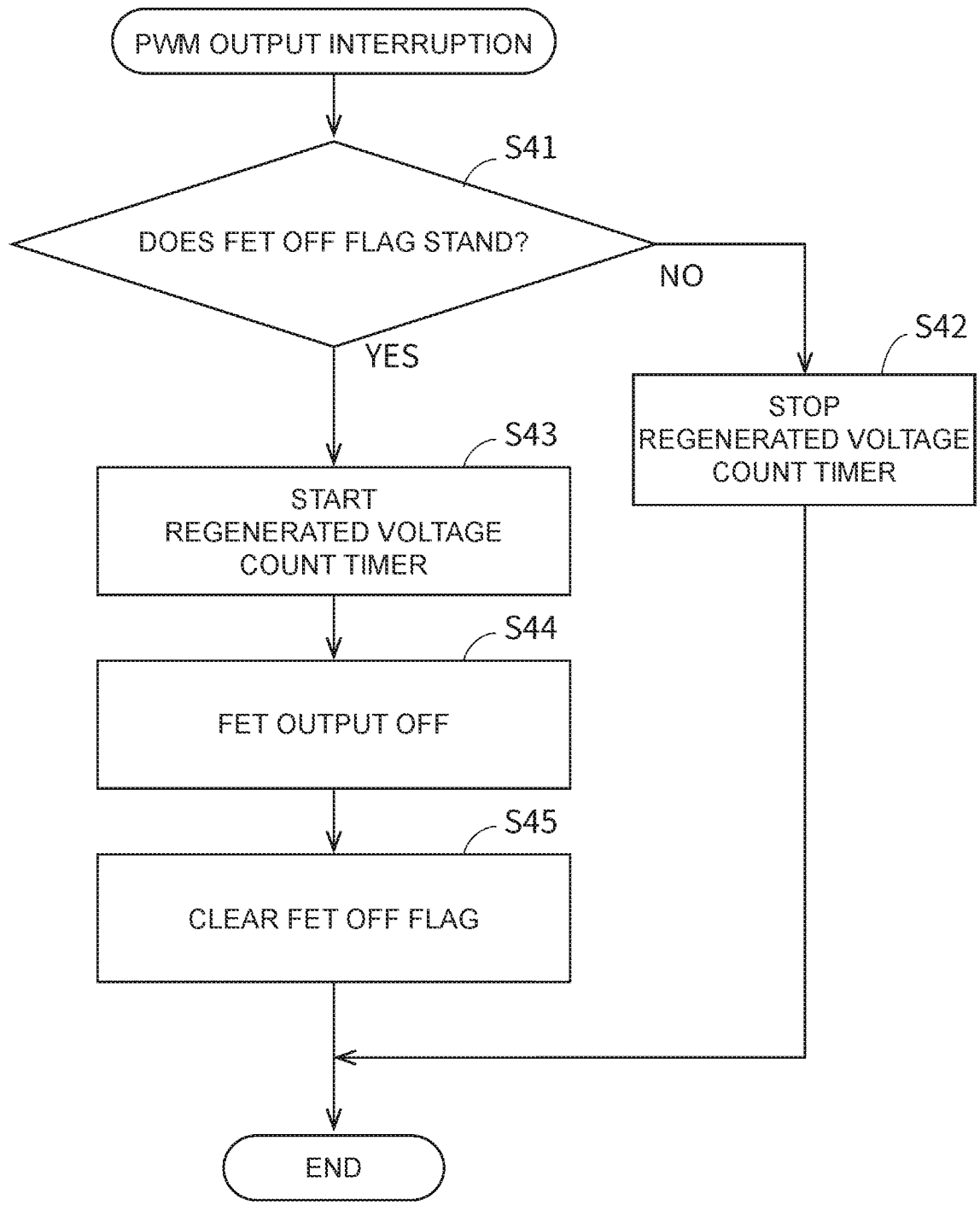
FIG. 5 is a flowchart showing the flow of interruption processing.

FIG. 5 is a flowchart showing the flow of interruption processing.

In the present embodiment, the main controller 31 performs the processing of stopping the driving signal based on the FET OFF flag. Such processing is performed as interruption processing in the processing shown in FIG. 3. The interruption processing is performed every cycle of the PWM signal.

In step S41, the main controller 31 checks whether the FET OFF flag stands. When the flag stands, the main controller 31 goes to the processing of step S43. On the other hand, when the flag does not stand, the main controller 31 goes to the processing of step S42.

In step S42, the main controller 31 causes the first counter 35 for counting the regenerated voltage to stop the count operation (stop a count timer), and finishes the interruption processing.

On the other hand, in step S43, the main controller 31 causes the first counter 35 for counting the regenerated voltage to start the count operation (start the count timer).

In step S44, the main controller 31 outputs the PWM output control signal, and causes the PWM output controller 33 to stop the output of the PWM signal. As a result, the output off period is started.

In step S45, the main controller 31 clears the FET OFF flag, and finishes the interruption processing.

Figure 6:
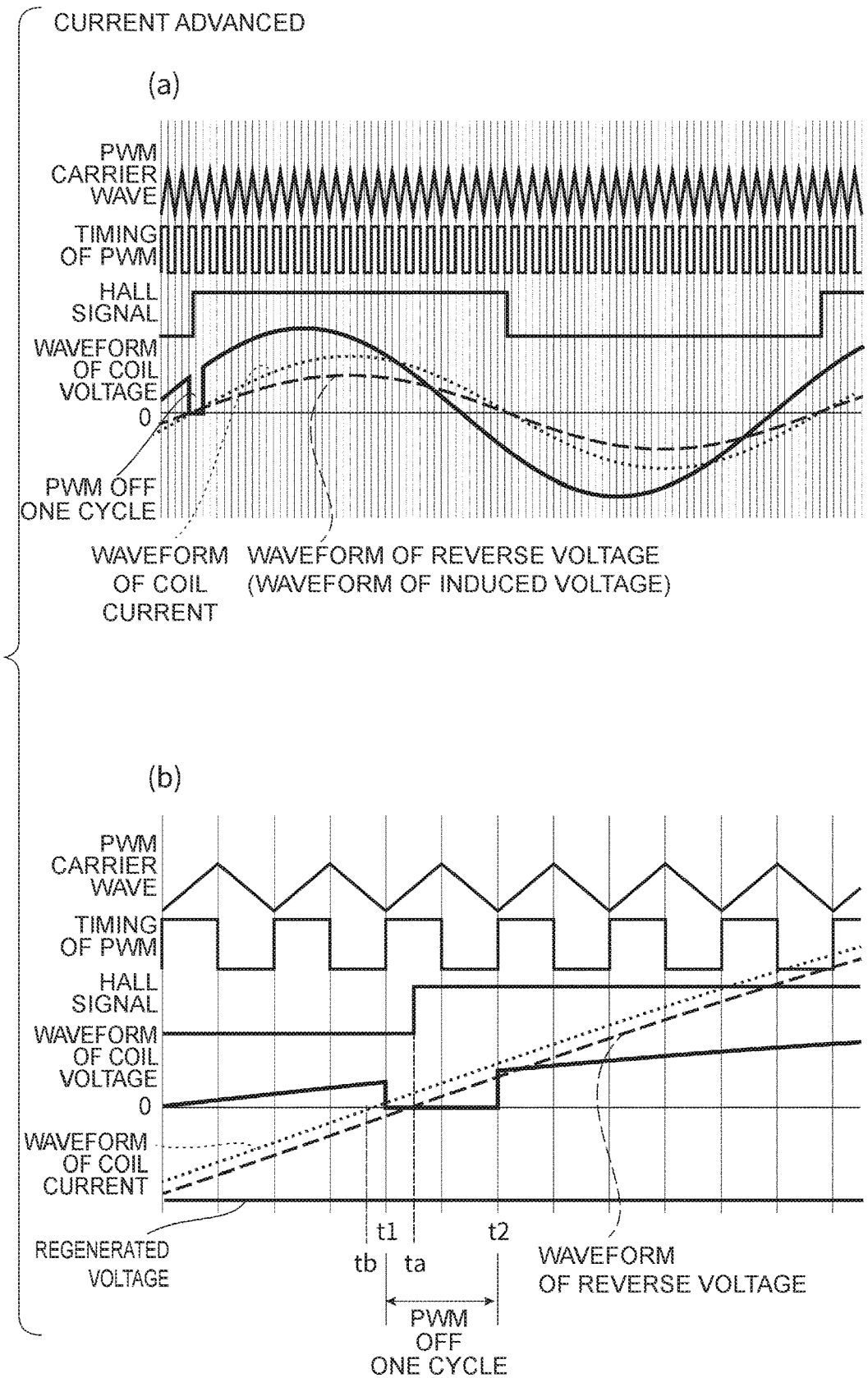
FIG. 6 is a first diagram showing an operation example of the present embodiment.
Figure 7:
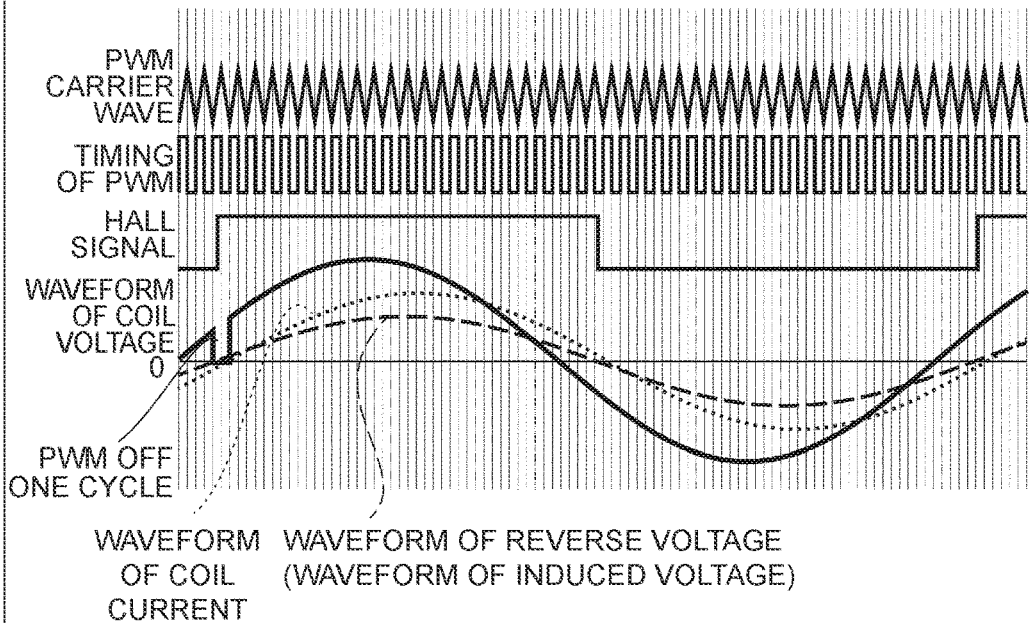
FIG. 7 is a second diagram showing an operation example of the present embodiment.
Figure 7:
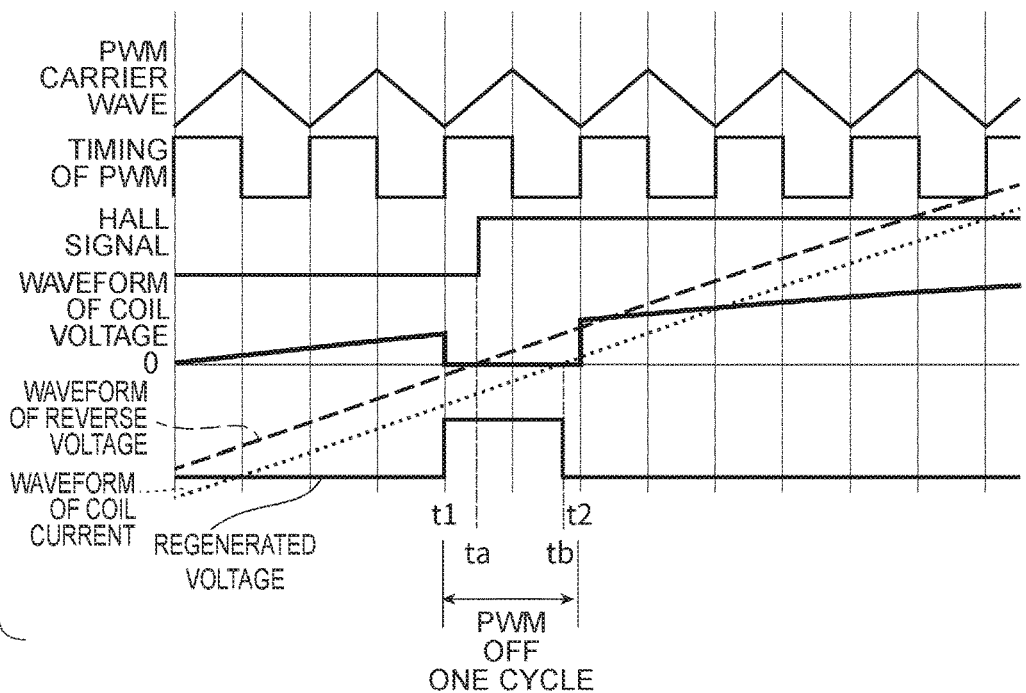

FIG. 6 is a first diagram showing an operation example of the present embodiment. FIG. 7 is a second diagram showing an operation example of the present embodiment. FIG.

Figure 9:
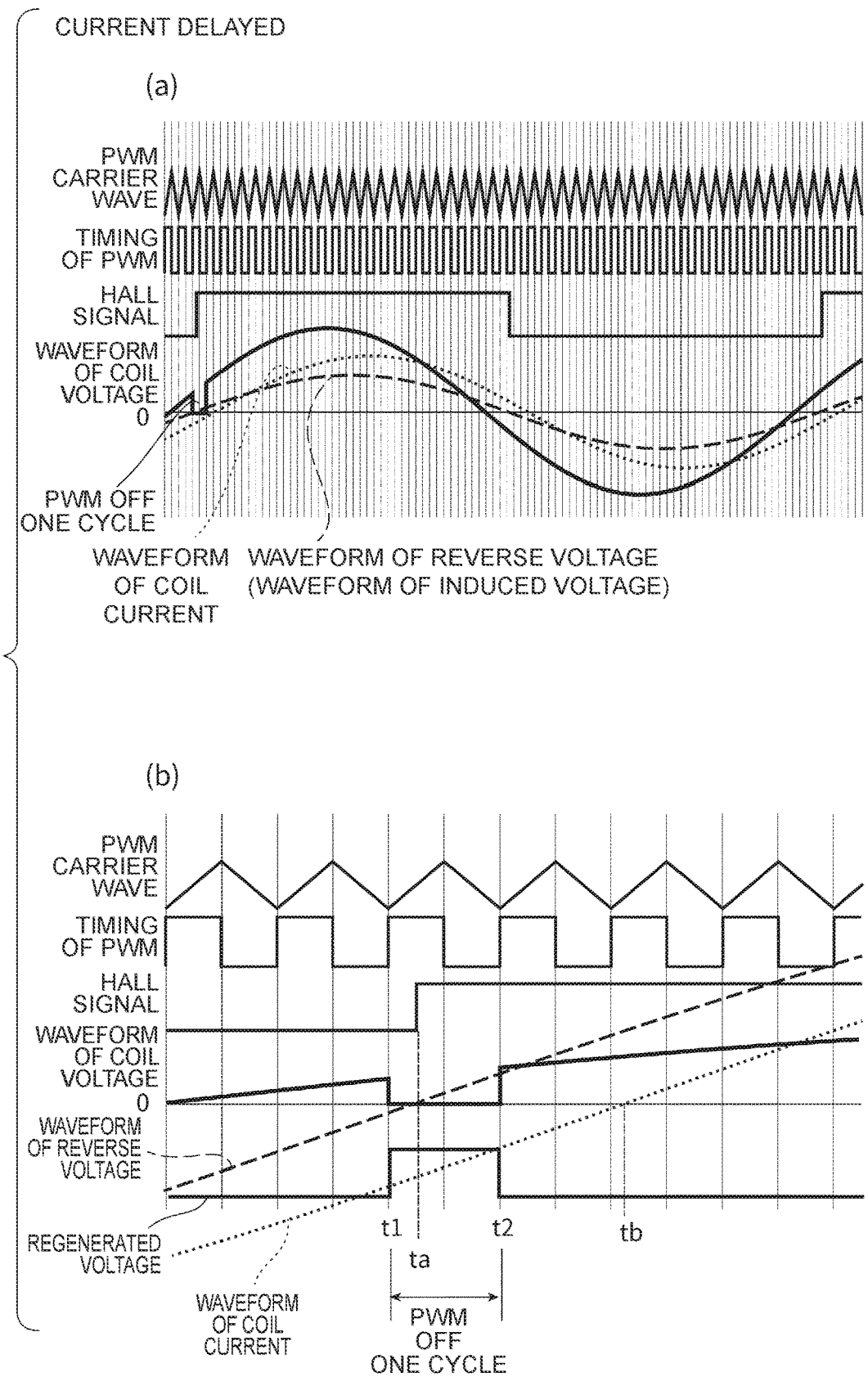
FIG. 9 is a fourth diagram showing an operation example of the present embodiment.

8 is a third diagram showing an operation example of the present embodiment. FIG. 9 is a fourth diagram showing an operation example of the present embodiment.

In each figures from FIG. 6 to FIG. 9, the upper stage (a) represents the waveforms of the respective signals and the like during almost one revolution of the rotor of the motor 7. The lower stage (b) is an enlarged view of the vicinity of the timing of the rising edge of the Hall signal out of the upper stage (a). In each figure, the diagram of the upper stage (a) represents the carrier wave of the PWM signal, the timing of the PWM signal, the Hall signal, various kinds of waveforms (a solid line represents the waveform of the coil voltage applied to the coil, a broken line represents the waveform of a reverse voltage (the waveform of the induced voltage), and a dotted line represents the waveform of the coil current) of a predetermined phase (for example, U phase or the like), these waveforms being successively arranged from the upper side. In the diagram of the lower stage (b), the waveform of the regenerated voltage is also shown to be arranged in alignment with the respective waveforms of the upper stage (a). Each of times ta, tb, t1 and t2 shown in the diagram represents the times corresponding to those described above (the times corresponding to the times shown in FIG. 2).

Figure 8:
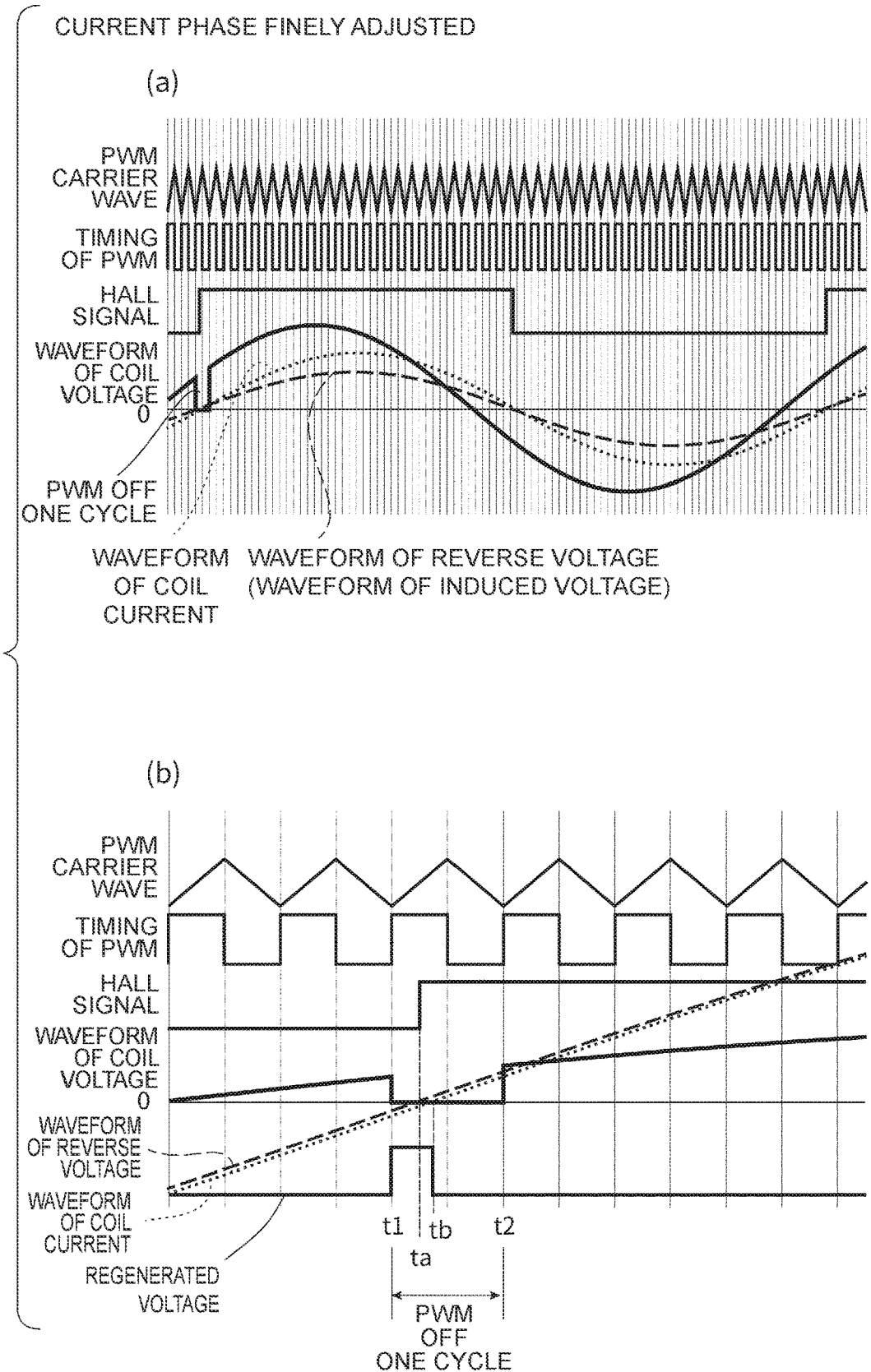
FIG. 8 is a third diagram showing an operation example the present embodiment.

An operation when the phase of the coil current advances with respect to the phase of the induced voltage will be described with reference to FIGS. 6 to 8.

As shown in FIG. 6, when the phase of the coil current advances with respect to the phase of the induced voltage, the zero-cross point (time tb) of the coil current can be estimated to be at an earlier timing than the start timing (time t1) of the output off period (PWM off one cycle). At this time, during the output off period from the time t1 to the time t2, the coil current is plus, and the pulse width of the regenerated voltage is equal to zero. In this case, the controller 3 estimates that the phase of the coil current advances with respect to the phase of the induced voltage, and thus delays the energization timing.

As shown in FIG. 7, when the energization timing is delayed and the zero-cross point (time tb) of the coil current enters the output off period (from the time t1 to the time t2), the pulse width of the regenerated voltage (the time t1 to the time tb) occurs, and counting is performed in the first counter 35.

In this case, the PWM data calculator 32 adjusts the energization timing so that the time from the start timing (the time t1) within the output off period to the pulse end timing (time tb) of the regenerated voltage is equal to the time from the start timing (the time t1) within the output off period to the zero-cross point (time ta) of the induced voltage. As a result, as shown in FIG. 8, the phase at the zero-cross point of the induced voltage and the phase at the zero-cross point of the coil current are adjusted to be matched with each other.

An operation when the phase of the coil current lags with respect to the phase of the induced voltage will be described with reference to FIGS. 9, 7 and 8.

As shown in FIG. 9, when the phase of the coil current lags with respect to the phase of the induced voltage, the zero-cross point (the time tb) of the coil current can be estimated to be at a timing later than the end timing (the time t2) of the output off period (PWM off one cycle). At this time, during the output off period from the time t1 to the time t2, the coil current is minus, and the pulse width of the regenerated voltage is equal to the length of the output off period (the length of one cycle of the PWM signal). In this case, the controller 3 estimates that the phase of the coil current lags with respect to the phase of the induced voltage, and advances the energization timing.

As shown in FIG. 7, when the energization timing is advanced and the zero-cross point (the time tb) of the coil current enters the output off period (from the time t1 to the time t2), the pulse width of the regenerated voltage (from the time t1 to the time tb) occurs, and counting is performed in the first counter 35.

In this case, the energization timing is adjusted as in the case of the foregoing. As a result, as shown in FIG. 8, the phase at the zero-cross point of the induced voltage and the phase at the zero-cross point of the coil current are adjusted to be matched with each other.

As described above, according to the present embodiment, in the section of one cycle of the PWM signal containing the rising edge of the Hall signal, the output of the driving signal is set to OFF, and the pulse width of the regenerated voltage in the period concerned is measured. The zero-cross point of the coil current is estimated, and the energization timing is adjusted based on the estimation result. Specifically, when the measured pulse width of the regenerated voltage is equal to zero, the phase of the coil current is estimated to advance with respect to the phase of the induced voltage, so that the energization timing is delayed. When the measured pulse width is equal to one cycle of the PWM signal, the phase of the coil current is estimated to lag with respect to the phase of the induced voltage, so that the energization timing is advanced. Accordingly, even when variation in motor characteristic occurs due to load variation, temperature variation or the like during operation of the motor 7, adjustment is automatically performed so as to reduce the difference in phase between the phase of the induced voltage of the motor and the phase of the coil current, and reduction of the efficiency of the motor 7 can be suppressed. Since the energization timing is adjusted so that the measured pulse width of the regenerated voltage is larger than zero and smaller than one cycle of the PWM signal, the phase of the coil current can be adjusted with higher precision, and the reduction of the efficiency of the motor 7 can be more greatly suppressed.

In the present embodiment, the energization timing is adjusted so that the phase of the zero-cross point of the induced voltage is matched with the phase of the zero-cross point of the coil current. Accordingly, the reduction of the efficiency of the motor 7 can be more effectively suppressed.

The output off period for which the output of the driving signal is stopped to measure the pulse width of the regenerated voltage is a short period corresponding to one cycle of the PWM signal. Accordingly, an influence of provision of the output off period on the rotation of the motor 7 is small.

The zero-cross point of the induced voltage is configured to approach to the timing of the rising or falling edge of the Hall signal detected by the Hall sensor 8. By providing the Hall signal synchronous with the reverse voltage as described above, the position of the edge of the Hall signal is detected without measuring the reverse voltage, whereby the phase difference can be detected with a relatively simple configuration.

[Others]

The motor driving control device is not limited to circuit configurations shown in the present embodiment described above and modifications of the present embodiment. Various circuit configurations constructed to fit the purpose of the present disclosure can be applied.

The motor driving mode is not limited to a normal sinusoidal-wave driving mode, and it may be a rectangularwave driving mode, a trapezoidal-wave driving mode, a sinusoidal-wave driving mode to which special modulation is applied, or the like.

The phase to be monitored is not limited to the U phase. Another phase may be monitored, or a plurality of phases may be monitored. That is, at least one phase of a phase for which the Hall sensor is provided and a phase for detecting the induced voltage is sufficient. Increase of the number of phases to be monitored makes the precision higher.

The foregoing flowcharts are examples for describing the operation, and the present disclosure is not limited to these flowcharts. The steps shown in each diagram of flowcharts are specific examples, and the present disclosure is not limited to these procedures. For example, the order of the respective steps may be altered, another process may be interposed between these steps, or the processes may be performed in parallel.

The motor to be driven by the motor driving control device of the present embodiment is not limited to a three-phase brushless motor, and may be brushless motors of another number of phases such as a single phase, two-phase or more. The type of the motor is also not limited to a specific one.

A part or all of the processing in the present embodiment described above may be performed by software or by using a hardware circuit. For example, the controller is not limited to a microcomputer. The internal configuration of the controller may be designed so that at least a part of the internal configuration is processed by software.

It should be considered that the present embodiment described above is exemplificative in the whole content, but not restrictive. The scope of the present disclosure is not represented by the foregoing descriptions, but represented by Claims, and is intended to contain meanings equivalent to Claims and all alterations within Claims.

What is claimed is:

1. A motor driving control device comprising:
   an induced voltage detecting unit configured to detect an induced voltage of a motor;
   a controller for generating a PWM signal corresponding to an energization timing of the motor; and
   an inverter circuit for outputting a driving signal for driving the motor to the motor based on the PWM signal generated by the controller, wherein the controller comprises:
   a position detecting unit comprising at least one Hall sensor, the position detecting unit being configured to detect a position detection signal based on a detection result from the at least one Hall sensor, the position detection signal containing a rising or falling edge representing a timing at which a position of a rotor is a predetermined position;
   a counter configured to stop output of the driving signal only for a predetermined period containing a zero-cross point of the induced voltage of the motor and to measure a pulse width of a regenerated voltage of the motor in the predetermined period containing a detected timing of the rising or falling edge of the position detection signal corresponding to the zero-cross point of the induced voltage of the motor, wherein the regenerated voltage is a voltage generated in a coil of a phase of the motor when the output of the driving signal is stopped;
   a calculating unit configured to calculate a zero-cross point of coil current of the motor based on the pulse width of the regenerated voltage measured by the measuring unit; and
   an adjusting unit configured to adjust the energization timing of the motor based on a calculation result of the calculating unit,
   wherein the adjusting unit adjusts the energization timing of the motor so that the pulse width of the regenerated voltage measured by the measuring unit is larger than zero and shorter than the length of one cycle of the PWM signal,
   wherein the adjusting unit adjusts the energization timing of the motor so as to delay the energization timing of the motor when the pulse width of the regenerated voltage measured by the measuring unit is equal to zero, and adjusts the energization timing of the motor so as to advance the energization timing of the motor when the pulse width of the regenerated voltage measured by the measuring unit is equal to the length of one cycle of the PWM signal, and
   wherein the Hall sensor is arranged so that the detected timing of the rising or falling edge of the position detection signal can be detected as the zero-cross point of the induced voltage of the motor.

2. The motor driving control device according to claim 1, wherein the measuring unit stops output of the driving signal only for the predetermined period containing the rising or falling edge of the position detection signal to measure the pulse width of the regenerated voltage of the motor in the period while the detected timing of the rising or falling edge of the position detection signal is set as the zero-cross point of the induced voltage of the motor.

3. The motor driving control device according to claim 1, wherein the position detecting unit comprises three Hall sensors.

4. The motor driving control device according to claim 1, wherein the predetermined period is a period of one cycle of the PWM signal.

5. The motor driving control device according to claim 1, wherein the adjusting unit adjusts the energization timing of the motor so that the phase at the zero-cross point of the induced voltage of the motor and the phase at the zero-cross point of the coil current are coincident with each other.

6. A control method of a motor driving control device including an induced voltage detecting unit for detecting an induced voltage of a motor, a controller for generating a PWM signal corresponding to an energization timing of the motor and an inverter circuit for outputting a driving signal for driving the motor to the motor based on the PWM signal generated by the controller, the method comprising:
   a position detecting step of detecting a position detection signal of at least one Hall sensor, the position detection signal containing a rising or falling edge representing a timing at which a position of a rotor is a predetermined position;
   a measuring step of stopping output of the driving signal only for a predetermined period containing a zero-cross point of the induced voltage of the motor and measuring a pulse width of a regenerated voltage of the motor in a the predetermined period containing a detected timing of the rising or falling edge of the position detection signal corresponding to the zero-cross point of the induced voltage of the motor, wherein the regenerated voltage is a voltage generated in a coil of a phase of the motor when the output of the driving signal is stopped;
   a calculating step of calculating a zero-cross point of coil current of the motor based on the pulse width of the regenerated voltage; and an adjusting step of adjusting the energization timing of the motor based on a calculation result of the calculating step, the predetermined period being a period of one cycle of the PWM signal, wherein the adjusting step adjusts the energization timing of the motor so that the pulse width of the regenerated voltage measured in the measuring step is larger than zero and shorter than the length of one cycle of the PWM signal, and wherein the adjusting step adjusts the energization timing of the motor so as to delay the energization timing of the motor when the pulse width of the regenerated voltage measured in the measuring step is equal to zero, and adjusts the energization timing of the motor so as to advance the energization timing of the motor when the pulse width of the regenerated voltage measured in the measuring step is equal to the length of one cycle of the PWM signal, and wherein the Hall sensor is arranged so that the detected timing of the rising or falling edge of the position detection signal can be detected as the zero-cross point of the induced voltage of the motor.

* * * * *